US010487817B1

(12) United States Patent
Shan

(10) Patent No.: US 10,487,817 B1
(45) Date of Patent: Nov. 26, 2019

(54) METHODS FOR CREATING AN UNDULATING STRUCTURE

(71) Applicant: Baoxiang Shan, Hoboken, NJ (US)

(72) Inventor: Baoxiang Shan, Hoboken, NJ (US)

( * ) Notice: Subject to any disclaimer, the term of this patent is extended or adjusted under 35 U.S.C. 154(b) by 0 days.

(21) Appl. No.: 16/251,329

(22) Filed: Jan. 18, 2019

Related U.S. Application Data

(60) Provisional application No. 62/793,145, filed on Jan. 16, 2019, provisional application No. 62/754,653, filed on Nov. 2, 2018.

(51) Int. Cl.

| | |
|---|---|
| ***B06B 1/14*** | (2006.01) |
| ***F04B 19/20*** | (2006.01) |
| ***F04B 43/00*** | (2006.01) |
| *B06B 3/02* | (2006.01) |
| *F03G 7/06* | (2006.01) |

(52) U.S. Cl.
CPC ............ *F04B 43/0054* (2013.01); *B06B 1/14* (2013.01); *B06B 3/02* (2013.01); *F03G 7/065* (2013.01); *F04B 19/20* (2013.01); *F05B 2220/709* (2013.01)

(58) Field of Classification Search
CPC .......... F04B 43/046; F04D 33/00; B06B 1/04; B06B 3/02
See application file for complete search history.

(56) References Cited

U.S. PATENT DOCUMENTS 3,964,316 A * 6/1976 Abe ...................... G01M 10/00 73/865.9
6,050,787 A * 4/2000 Hesketh ................ F04B 43/067 251/129.01
6,074,178 A * 6/2000 Bishop .................. F04B 17/003 310/328
6,269,500 B1 * 8/2001 Saringer .................. A47C 3/02 440/16
7,166,952 B2 * 1/2007 Topliss .................. H01L 41/094 310/330
7,553,135 B2 * 6/2009 Cho ...................... F04B 43/046 361/688
8,432,057 B2 * 4/2013 Filardo ................. F03B 13/188 290/54
8,610,304 B2 12/2013 Filardo (Continued)

*Primary Examiner* — Patrick Hamo
(74) *Attorney, Agent, or Firm* — r.r (princeton); Roy Rosser

(57) ABSTRACT

Methods for creating undulating structures are disclosed in which an elastic sheet and a rigid restraining member having different curvatures are joined. The structures incorporate stopping members, such as stopped grooves, to manage the transverse deformations of the elastic sheet. The joint is such that the transverse deformations may migrate along the undulating structure in a coordinated, wave, either to gather kinetic energy, or to propel the structure relative to a fluid. To facilitate such a wave, the elastic sheet can be joined to the retaining member via passive stopping members that oscillate about their points of attachment to the retaining member. These are also constructed to limit the elastic sheet from reverting to its original configuration. The retaining member can be annular structures, and the elastic sheet members can be tubular. Stopping members can be actuated to power the transverse deformations of the elastic sheet to oscillate.

20 Claims, 6 Drawing Sheets

101

102

SECTION ON "A-A"

(56) References Cited

U.S. PATENT DOCUMENTS

| | | | | |
|---|---|---|---|---|
| 9,121,401 | B2 * | 9/2015 | Richardson | F04C 25/00 |
| 9,644,624 | B2 * | 5/2017 | Tanaka | F04D 33/00 |
| 9,744,563 | B2 | 8/2017 | Benjamin | |
| 9,976,547 | B2 * | 5/2018 | Tanaka | F04B 45/047 |
| 2017/0101997 | A1 * | 4/2017 | Wagner-Stafford | F04D 33/00 |

* cited by examiner

SECTION ON "A-A"

101

104

SECTION ON "B-B"

106

SECTION ON "C-C"

METHODS FOR CREATING AN UNDULATING STRUCTURE

CROSS-REFERENCE TO RELATED APPLICATIONS

This application claims priority to U.S. Ser. No. 62/793,145 filed on Jan. 16, 2019 by Baoxiang Shan entitled "Methods of Creating Undulating Structures for Imparting Relative Motion", and to U.S. Ser. No. 62/754,653 filed Nov. 2, 2018 by Baoxiang Shan entitled "Buckling Loop and Stress Wave Devices", the contents of both of which are hereby fully incorporated herein by reference.

BACKGROUND OF THE INVENTION

The invention relates to methods of creating undulating structures, and more particularly to methods of deforming, or buckling, sheet-like members into persistent, transverse deformations having changeable locations, and which may be used as machines, or pumps, to facilitate useful energy conversion via swinging-flap type, repetitive undulating motion.

(1) FIELD OF THE INVENTION

The technical problem of creating undulating structures is inherent in, for instance, the branch of mechanical engineering in which passive, or actuated, devices create a prescribed, repetitive undulating motion, or effect, in order to either harness the kinetic energy of moving fluids, or to create the movement of the fluids themselves.

(2) DESCRIPTION OF THE RELATED ART

Relevant such devices are described in, for instance, U.S. Pat. No. 8,610,304 issued to Filardo on Dec. 17, 2013 entitled "Mechanisms for creating undulating motion, such as for propulsion, and for harnessing the energy of moving fluid", the contents of which are hereby incorporated by reference in their entirety. This patent describes mechanisms which receive and transfer forces via transducers having one or more persistent deformations in changeable locations. Actuator or propulsion embodiments are powered by elastic or variable length transducers that exert forces on the deformed members which in turn exert forces onto ambient fluid such as air or water. Generator embodiments receive forces from ambient moving fluid via deformed members which transfer those forces to elastic or variable length transducers which convert those forces into electrical energy.

U.S. Pat. No. 9,744,563 issued to Benjamin, et al. on Aug. 29, 2017 entitled "Undulatory structures" that describes an undulatory structure and methods for the fabrication and use thereof. The undulatory structure includes a buckled sheet and one or more work input elements for deforming the buckled sheet in an undulating manner wherein each point in a series of points on a sinuously-shaped profile of the buckled sheet travels at least partially along a figure eight-shaped path. The undulatory structure can be adapted for use as a solid-state transducer wherein the buckled sheet provides mechanical advantage without appreciable opposition from elastic restoring forces, thereby achieving improved force, displacement and efficiency characteristics.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

Inventive methods for creating undulating structures are disclosed.

An undulating structure may be created by joining an elastic sheet to a rigid restraining member if an attachment edge of the elastic sheet differs in curvature from that of a restraining edge of the restraining member. The join between the attachment edge and the restraining edge may result in the elastic sheet buckling, and forming one or one or more transverse deformations, thereby forming the undulating structures.

In a preferred embodiment, the rigid restraining member, and more particularly, it's restraining edge, may be curved. The curved, rigid restraining member may also incorporate one or more stopping members that may serve to manage, or limit, the magnitude of the buckles, or transverse deformations. The stopping members may, for instance, be the sides of a stopped groove that may also be serving as the retaining edge.

Joining the attachment edge to the restraining edge may be accomplished in a variety of ways, as described in more detail below. It is preferable that the transverse deformations are able to migrate along the undulating structure in a coordinated, wave, as an objective of forming the undulating structure may be to either gather kinetic energy from a flowing fluid, or to propel the structure relative to a fluid. To help facilitate such a wave, the elastic sheet may be joined to the rigid retaining member via suitably located passive, but movable, stopping members that may oscillate about their points of attachment to the retaining member. As discussed in more detail below, in certain combinations of elastic sheet and rigid retainer, these passive stopping members may be constructed to limit the elastic sheet from reverting to its original shape, or configuration. These passive stopping members may, therefore, manage these transverse deformations such that they are preserved, but able to migrate along the undulating structure in a coordinated, wave-like motion.

In a further preferred embodiment, the rigid retaining member may be an annular, ring shaped structure, and the elastic sheet member may be tubular, and, for instance, shaped as a cylindrical shell. In such an arrangement the attachment edge may be a lower edge of the cylindrical shell, and the stopping member may be a stopped groove in the rigid ring.

In another embodiment, one or more of the passive stopping members may be an actuated, or active, stopping member that may power the elastic sheet member to oscillate. Such an active stopping member may, for instance, be powered by an electrical stepping motor, and may facilitate migration of the transform deformations in a coordinated wave.

A wide, but not exhaustive, variety of exemplary shapes of both curved, rigid restraining members and elastic sheet members are described in more detail below, long with stopping members and actuators that may be used with them in forming, and manipulating, the undulating structures.

Therefore, the present invention succeeds in conferring the following, and others not mentioned, desirable and useful benefits and objectives.

It is an object of the present invention to provide simple, but effective, methods for creating undulating structures that may be used to harness kinetic energy or create propulsion.

DETAILED DESCRIPTION OF THE INVENTION

Figure 1A:
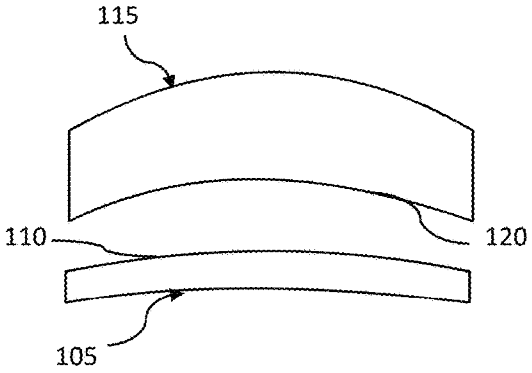
FIG. 1A shows a schematic plan view of an exemplary curved, rigid restraining member and an elastic sheet member of the present invention that may be combined to form an undulating structure.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

An undulating structure may be created by joining a curved, rigid restraining member to an elastic sheet member having an attachment edge that differs in curvature from the restraining member. The join may, for instance, be along the attachment edge and may result in an undulating structure having one or more transverse deformations, or buckles. This buckling to form transverse deformations may also, or instead, be induced in the elastic sheet by twisting, or rotating, the elastic sheet member after, or as a part of the attachment process. These transverse deformations may be managed, or preserved, by, for instance, a stopping edge, or one or more suitably located stopping members, shaped and sized to limit a range and a maximum amplitude of the transverse deformations. This may, for instance, prevent the elastic sheet member from reverting to its original configuration, thereby preserving the deformations. The transverse deformations may, however, be able to move in a concerted, undulating motion that may be made repetitive, and may migrate along the undulating structure in a coordinated, wave.

The curved, rigid restraining member may be made of any suitably rigid and, preferably, machinable of moldable, material such as, but not limited to, a metal, a metal alloy, a rigid polymer, a ceramic or a plastic, or some combination thereof.

The elastic sheet member may be made of any suitably flexible, or elastic material, such as, but not limited to, a polymer, a plastic, a thin metal alloy, or some combination thereof. The elastic sheet material is preferably of uniform thickness, and springy in the sense that it may be elastically deformed and spring back, or attempt to spring back, to its original shape.

FIG. 1A shows a schematic plan view of an exemplary curved, rigid restraining member 105 and an elastic sheet member 115 that may be combined to form such an undulating structure. The curved, rigid restraining member 105 may have a curved restraining edge 110 that may differ in curvature from the attachment edge 120 of the elastic sheet member 115.

Figure 1B:
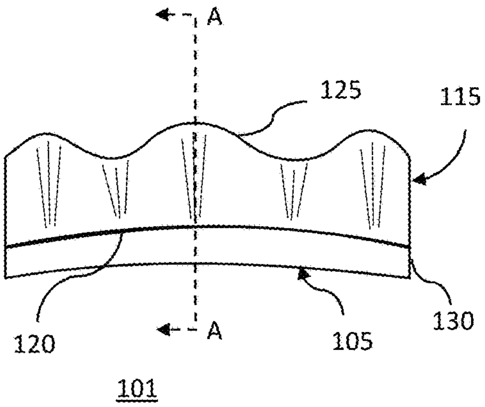
FIG. 1B shows a schematic plan view of a curved, rigid restraining member and an elastic sheet member combined to form an exemplary undulating structure of the present invention.

FIG. 1B shows a schematic plan view of the curved, rigid restraining member 105 and elastic sheet member 115 combined to form an exemplary undulating structure 101. The join may have the attachment edge 120 of the elastic sheet member joined along its length to the curved restraining edge of the curved, rigid restraining member 105. This may result in the elastic sheet member buckling, or deforming, to form one or more transverse deformations. These transverse deformations 125, may, for instance, be stabilized, or preserved, by suitably located stopping members. An amplitude of the transverse deformations 125 may, for instance, be proportional to a difference in the curvatures of the restraining edge and the attachment edge, with a greater difference resulting in a greater amplitude of the deformation.

The joining may be by any suitable method such as, but not limited to, gluing, welding, riveting, clamping, or by one or more suitable active or passive stopping members, or some combination thereof.

Figure 1C:
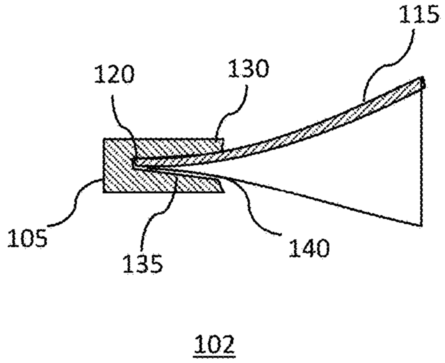
FIG. 1C shows a cross-sectional view of a cross-section taken on "A-A" of FIG. 1B of an exemplary undulating structure of the present invention.

FIG. 1C shows a cross-sectional view 102 of the undulating structure of FIG. 1B. The attachment edge 120 of the elastic sheet member 115 is shown retained within a stopped groove 135 of the curved, rigid restraining member 105. The upper and lower edges of the stopped groove may effectively serve as stopping members 130 that may help manage and preserve the transverse deformations of the elastic sheet member.

Figure 1D:
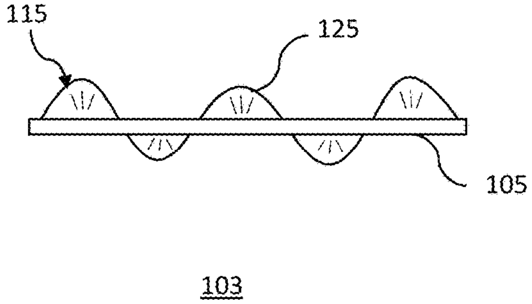
FIG. 1D shows a schematic side view of an exemplary undulating structure of the present invention.

FIG. 1D shows a schematic side view 103 of the undulating structure of FIG. 1B. In FIG. 1D, the transverse deformations 125 of the elastic sheet member 115 may be clearly seen preserved above and below the plane of the curved, rigid restraining member 105.

Figure 2A:
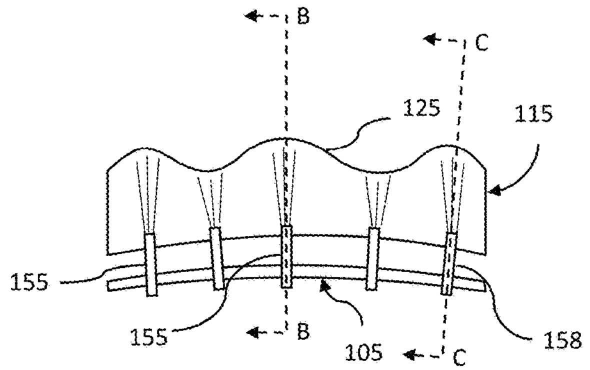
FIG. 2A shows a plan view of a further exemplary undulating structure of the present invention.

FIG. 2A shows a plan view of a further exemplary undulating structure 101.

As shown in FIG. 2A, the transverse deformations 125 of the elastic sheet member 115 may be induced and preserved by a number of stopping members that may be passive stopping members 155, or active stopping members 158, that may connect, or join, the elastic sheet member 115 to the curved, rigid restraining member 105.

Figure 2B:
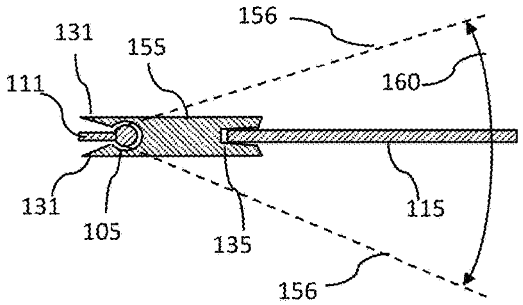
FIG. 2B shows a cross-sectional view taken on "B-B" of FIG. 2A of a passive stopping member of the present invention.

FIG. 2B shows a cross-sectional view 104 of an exemplary passive, but moveable, stopping member 155 that may be used in the undulating structure of FIG. 2A. The curved, rigid restraining member 105 may, for instance, be a curved, rigid rod, and the passive stopping member 155 may be shaped so as to be rotatably anchored to the curved, rigid restraining member 105.

The angular range 160 of motion of the passive stopping member 155 may be limited by a combination of a restraint stop 111, that may be a local extension of the curved, rigid restraining member 105, and by the stopping member end points 131.

At the end opposite from the anchoring point, the passive stopping member 155 may be attached to the elastic sheet member 115 by, for instance, a stopped groove 135.

The passive stopping member 155 may, therefore, limit a buckling amplitude of the transverse deformations of the elastic sheet member 115 to a predetermined angular range 160 of motion, lying within the range limits 156. The passive stopping member 155 may, therefore, help facilitate the formation and preservation of the transform deformations, while allowing them to propagate as a coordinated, repetitive wave along the length of the undulating structure.

Figure 2C:
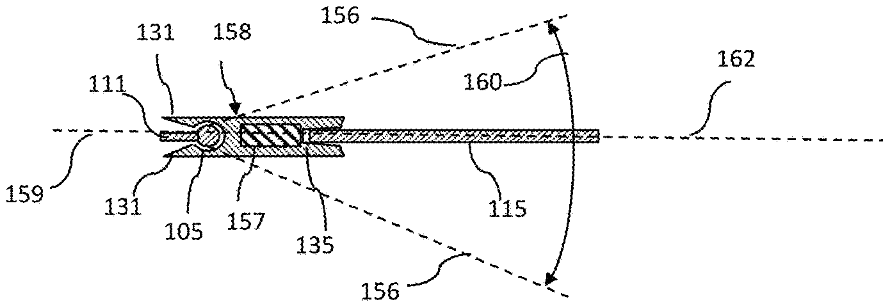
FIG. 2C shows a cross-sectional view taken on "C-C" of FIG. 2A of an active, stopping member of the present invention.

FIG. 2C shows a cross-sectional view 106 of one embodiment of an active stopping member.

The active stopping member 158 shown in FIG. 2C is similar to the passive stopping member 155 shown in FIG. 2B. It may be rotatably anchored, at an attachment point, to the curved, rigid restraining member 105, but limited in that rotation by a restraint stop 111, and the stopping member end points 131. The active, stopping member 158 may, therefore, only move in a predetermined angular range 160 between the range limits 156. In that way the elastic sheet member 115, shown attached to the active stopping member 158 via the stopped groove 135, may also be limited to moving in the predetermined angular range 160. The passive stopping member 155 may differ, however, from the passive stopping member 155 of FIG. 2B in that there may be an actuator 157. The actuator may be capable of producing motion and may be electrically power. The actuator may, therefore, be a device such as, but not limited to, a piezoelectric actuator, or an electrical stepping motor, or some combination thereof. The actuator may, for instance, cause the stopped groove 135 end of the active stopping member 158 to rotate, or oscillate about an axis 159 of the active stopping member. Such a rotation may impart a twisting force to the elastic sheet member such that transverse deformations may be induced to travel along its length in a coordinated wave. In this way the active stopping member 158 may power the elastic sheet member to oscillate.

The predetermined angular range 160 may be some reasonable range of motion such as, but not limited to, +/−45 degrees of a mean position 162 of the elastic sheet member.

FIGS. 3A-D show exemplary plan views of combinations of curved, rigid restraining members and elastic sheet members that may be combined to form undulating structures. The curvatures of the edges are described as either convex or concave with respect to the main body of the element. One of ordinary skill in the art will appreciate that an edge having a high degree of curvature has a shorter radius of curvature than the radius of curvature of an edge having a lesser degree of curvature, i.e., curvature and radius of curvature are inversely related.

Figure 3A:
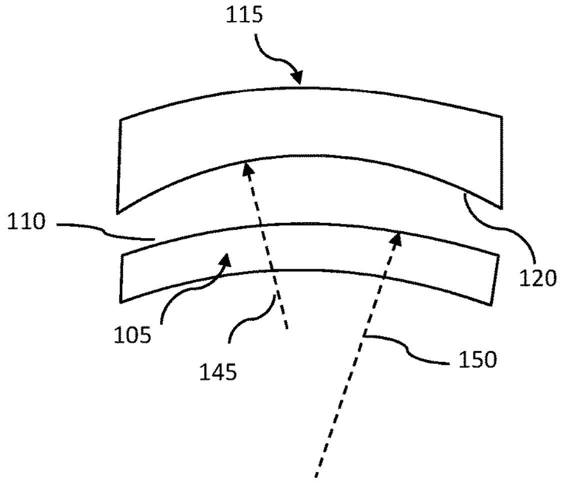
FIG. 3A shows a schematic plan view of an exemplary convex, curved, rigid restraining member and an elastic sheet member having a concave attachment edge of the present invention that may be combined to form an undulating structure.

FIG. 3A shows a schematic plan view of an exemplary convex, curved, rigid restraining member and an elastic sheet member having a concave attachment edge of the present invention that may be combined to form an undulating structure.

As shown in FIG. 3A, the curved, rigid restraining member 105 may have a convex restraining edge 110 having a radius of curvature 150. The elastic sheet member 115 may have a concave (with respect to the material) attachment edge 120, having a radius of curvature 145. The attachment edge radius of curvature 145 may be smaller than the restraining edge radius of curvature 150, i.e., the curvature of the attachment edge radius of curvature 145 is greater that the curvature of the curved restraining edge 110. In this way, when the attachment edge is joined to the restraining edge, an undulating structure may be formed.

In general, if the restraining edge is convex, the attachment edge must be concave, and the attachment edge must have a greater curvature, and, therefore, smaller radius of curvature. This may, for instance, ensure that a portion of the attached elastic sheet member 115 is under compression, and may therefore buckle to form the desired undulating structure.

Figure 3B:
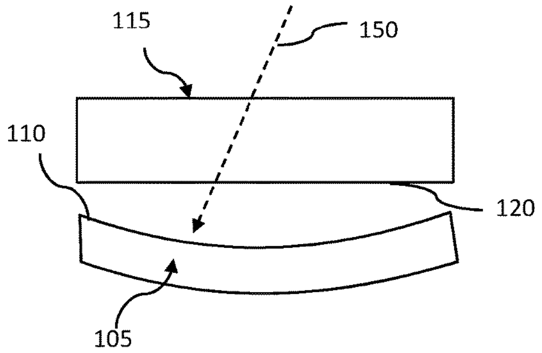
FIG. 3B shows a schematic plan view of an exemplary concave, curved, rigid restraining member and an elastic sheet member having a straight attachment edge of the present invention that may be combined to form an undulating structure.

FIG. 3B shows a schematic plan view of an exemplary concave, curved, rigid restraining member and an elastic sheet member having a straight attachment edge of the present invention that may be combined to form an undulating structure.

As shown in FIG. 3B, the curved, rigid restraining member 105 may have a concave restraining edge 110 having a radius of curvature 150. The elastic sheet member 115 may, however, have a straight attachment edge 120 as its attachment edge. A straight line may be interpreted as having an infinite radius of curvature, and it is, therefore, larger than the radius of curvature 150 of the retaining edge 110. When the attachment edge is joined to the restraining edge, an undulating structure may be formed.

Figure 3C:
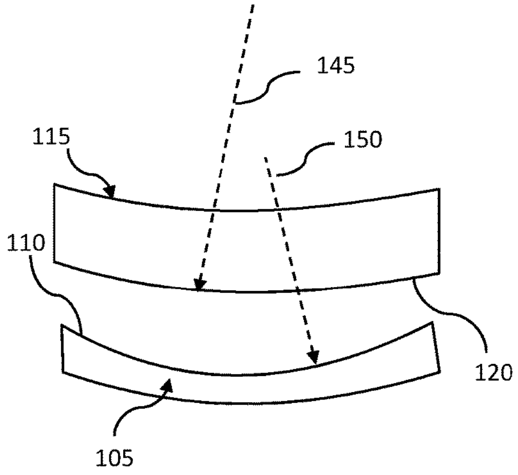
FIG. 3C shows a schematic plan view of an exemplary concave, curved, rigid restraining member and an elastic sheet member having a convex attachment edge of the present invention that may be combined to form an undulating structure.

FIG. 3C shows a schematic plan view of another exemplary concave, curved, rigid restraining member, this time with an elastic sheet member having a convex attachment edge. These may be combined to form an undulating structure.

As shown in FIG. 3C, the curved, rigid restraining member 105 may have a concave restraining edge 110 having a radius of curvature 150. The elastic sheet member 115 may have a convex (with respect to the material) attachment edge 120, having a radius of curvature 145. The attachment edge radius of curvature 145 may be larger than the restraining edge radius of curvature 150, i.e., the attachment edge may have a smaller curvature than the restraining edge, so that when the attachment edge is joined to the restraining edge, an undulating structure may be formed.

Figure 3D:
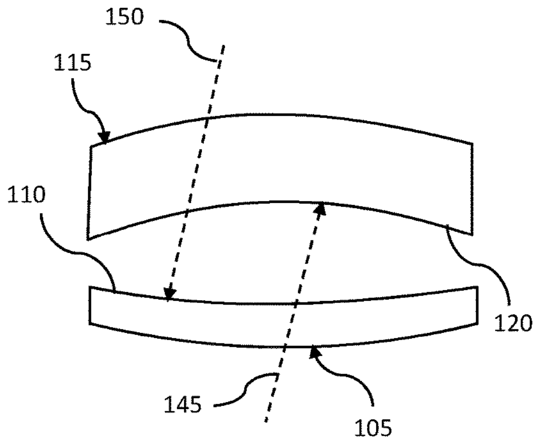
FIG. 3D shows a schematic plan view of an exemplary concave, curved, rigid restraining member and an elastic sheet member having a concave attachment edge of the present invention that may be combined to form an undulating structure.

FIG. 3D shows a schematic plan view of a further exemplary rigid restraining member 105 having a concave restraining edge 110. In this instance the elastic sheet member may have also have a concave attachment edge and may be combined with the curved, rigid restraining member 105 to form an undulating structure.

As shown in FIG. 3C, the curved, rigid restraining member 105 may have a concave restraining edge 110 having a radius of curvature 150. The elastic sheet member 115 may also have a concave (with respect to the material) attachment edge 120, having a radius of curvature 145. The attachment edge radius of curvature 145 may differ from, or be equal to the restraining edge radius of curvature 150, and when the attachment edge is joined to the restraining edge, an undulating structure may be formed.

Figure 4A:
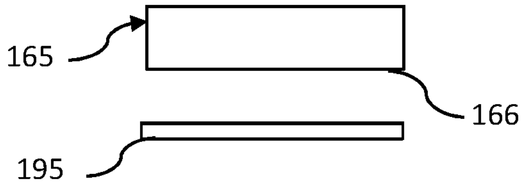
FIG. 4A shows a schematic side view of an exemplary rigid ring and an elastic right circular cylindrical shell that may be combined to form an undulating structure of the present invention.

FIG. 4A shows a schematic side view of an exemplary rigid ring and an elastic right circular cylindrical shell that may be combined to form an undulating structure of the present invention.

The right circular cylindrical shell 165 may, for instance, be made of a suitable elastic material, and have a lower edge 166 that may serve as an attachment edge, The rigid ring 195 may be made of a suitably rigid material, and a circular, inner perimeter of the ring may act as the curved restraining ring. This may, for instance, be in the form of a stopped groove, the groove oriented such that its open part faces inward, and the groove is in the plane of the ring.

Figure 4B:
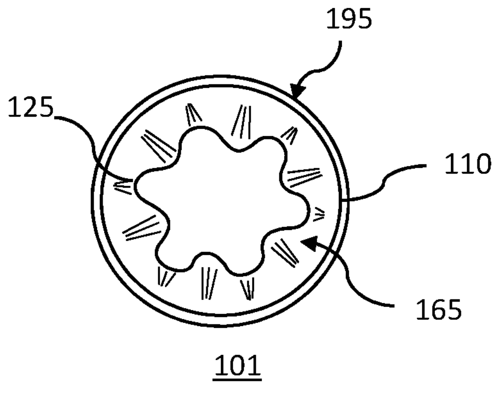
FIG. 4B shows a schematic plan view of an undulating structure of the present invention formed from a rigid ring and an elastic right circular cylindrical shell.

FIG. 4B shows a schematic plan view of an undulating structure of the present invention formed from a rigid ring and an elastic right circular cylindrical shell.

The right circular cylindrical shell 165 may, for instance, be attached by its lower edge to an inner perimeter of the rigid ring 195. This may, for instance, be achieved by inserting the lower edge into a stopped groove on the inner perimeter of the ring. Such a stopped groove may serve both as an retaining edge, and as a stopping member. When joined, the elastic right circular cylindrical shell may buckle and deform to have one or more transverse deformations 125, thereby forming an undulating structure.

In alternate embodiments, the joining of the right circular cylindrical shell 165 to the rigid ring 195 may be achieved instead by one or more movable, passive stopping members, or by one or more active, stopping members, or some combination thereof.

Figure 5A:
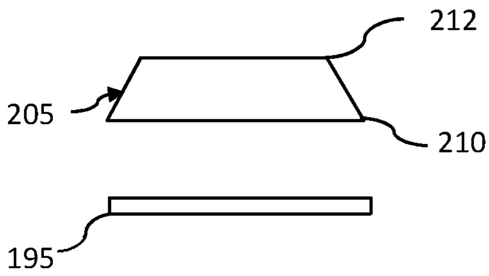
FIG. 5A shows a schematic side view of an exemplary rigid ring and a flexible frustum of a cone that may be combined to form an undulating structure of the present invention.

FIG. 5A shows a schematic side view of an exemplary rigid ring and a flexible frustum of a cone that may be combined to form an undulating structure of the present invention.

The frustum of a cone 205 may, for instance, be made of a suitable elastic material, and have an upper edge 212 that is circular, and has a smaller diameter than a lower edge 210 of said frustum of said cone. The lower edge 210 of the frustum of the cone may, for instance, serve as an attachment edge, The rigid ring 195 may be made of a suitably rigid material, and a circular, inner perimeter of the ring may act as the curved restraining ring. This may, for instance, be in the form of a stopped groove, that may, for instance, be oriented such that its open part faces inward, and the groove is in the plane of the ring.

Figure 5B:
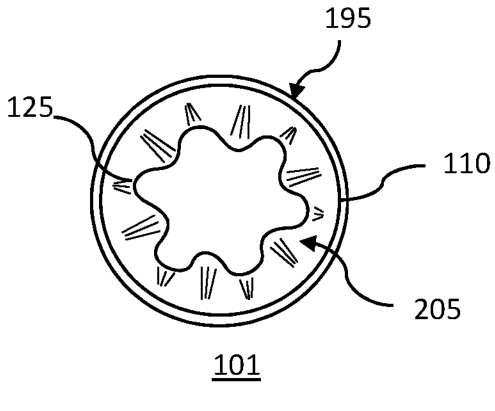
FIG. 5B shows a schematic plan view of an undulating structure of the present invention formed from a rigid ring and a flexible frustum of a cone.

FIG. 5B shows a schematic plan view of an undulating structure of the present invention formed from a rigid ring and a flexible frustum of a cone.

The frustum of a cone 205 may, for instance, be attached by its lower edge to an inner perimeter of the rigid ring 195. This may, for instance, be achieved by inserting the lower edge into a stopped groove on the inner perimeter of the ring. Such a stopped groove may serve both as an retaining edge, and as a stopping member. When joined, the elastic frustum of a cone may buckle and deform to have one or more transverse deformations 125, thereby forming an undulating structure.

In alternate embodiments, the joining of the frustum of a cone 205 to the rigid ring 195 may be achieved instead by one or more movable, passive stopping members, or by one or more active, stopping members, or some combination thereof.

Figure 6A:
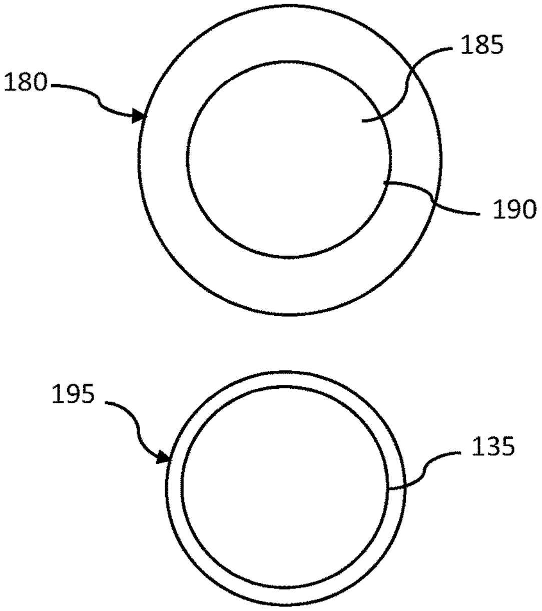
FIG. 6A shows a schematic plan view of an exemplary rigid ring and a flexible disc that may be combined to form an undulating structure of the present invention.

FIG. 6A shows a schematic plan view of an exemplary rigid ring and a flexible disc that may be combined to form an undulating structure of the present invention.

The disc 180 may, for instance, be made of a suitable elastic material, and have an interior cutout 185. A perimeter 190 of the interior cutout may serve as an attachment edge, The rigid ring 195 may be made of a suitably rigid material, and a circular, inner perimeter of the ring may act as the curved restraining ring. This may, for instance, be in the form of a stopped groove 135 on the perimeter, the groove oriented such that its open part faces inward, and the groove is in the plane of the ring.

Alternately, the retaining edge may be effectively located on other parts of such a rigid ring, such as, but not limited to, the outer perimeter, or an upper or lower surface of the ring. The restraint may be by devices such as, but not limited to, a stopped grove, a passive stopping member, a movable passive stopping member, or an active stopping member, or some combination thereof.

Figure 6B:
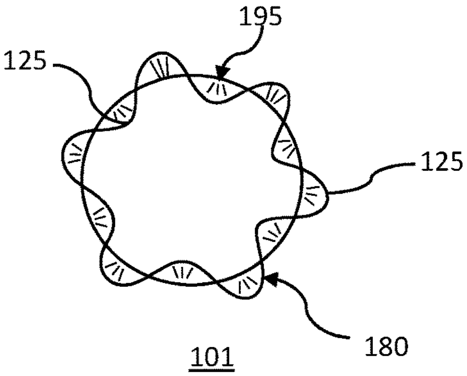
FIG. 6B shows a schematic plan view of an undulating structure of the present invention formed from a rigid ring and a flexible disc.

FIG. 6B shows a schematic plan view of an undulating structure of the present invention formed from a rigid ring and a flexible disc.

The disc 180 may, for instance, be attached by the perimeter of its interior cutout to an inner or other perimeter of the rigid ring 195. This may, for instance, be achieved by having a stopped groove on either the inner or outer perimeter of the ring. Such a stopped groove may serve both as an retaining edge, and as a stopping member. When joined, the elastic disc may buckle and deform to have one or more transverse deformations 125, thereby forming an undulating structure.

In alternate embodiments, the joining of the disc to the rigid ring 195 may be achieved instead by one or more passive stopping members, or by one or more active, stopping members, or some combination thereof.

Depending on a location of the restraining edge, a suitable undulating structure may be formed by having the mean angle of deformation of the disc be anywhere in the range from 10 to 170 degrees, though it more preferably lies with a more limited range of between 45 to 135 degrees, and may be selected so as to obtain a suitable amplitude of the transverse deformations of the undulating structure.

Figure 7A:
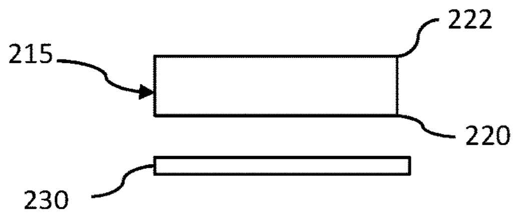
FIG. 7A shows a schematic side view of an exemplary rigid ring and a flexible right elliptic cylinder that may be combined to form an undulating structure of the present invention.

FIG. 7A shows a schematic side view of an exemplary rigid ring and a flexible right elliptic cylinder that may be combined to form an undulating structure of the present invention.

The right elliptic cylinder 215 may, for instance, be made of a suitable elastic material, and have an upper edge 222 that is an ellipse, and may be congruent to a lower edge 220 of the right elliptic cylinder. The lower, elliptical edge 220 of the right elliptic cylinder may, for instance, serve as an attachment edge, The rigid elliptical element 230 may be made of a suitably rigid material, and an elliptical, inner perimeter of the ring may act as the curved restraining ring. This may, for instance, be in the form of a stopped groove, the groove oriented such that its open part faces inward, and the groove is in the plane of the ring.

Figure 7B:
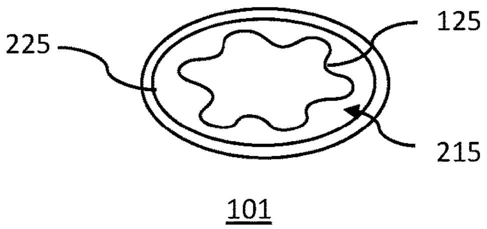
FIG. 7B shows a schematic plan view of an undulating structure of the present invention formed from a rigid ring and a flexible right elliptic cylinder.

FIG. 7B shows a schematic plan view of an undulating structure of the present invention formed from a rigid ring and a flexible right elliptic cylinder.

The elastic, right elliptic cylinder 215 may, for instance, be attached by the elliptical perimeter of its lower edge 220 to an inner, elliptical perimeter 225 of the rigid elliptical element. This may, for instance, be achieved by having a stopped groove on the inner perimeter of the rigid elliptical element. Such a stopped groove may serve both as an retaining edge, and as a stopping member. When joined, the elastic disc may buckle and deform to have one or more transverse deformations 125, thereby forming an undulating structure.

In alternate embodiments, the joining of the disc to the rigid elliptical element may be achieved instead by one or more passive stopping members, or by one or more active, stopping members, or some combination thereof.

Figure 8A:
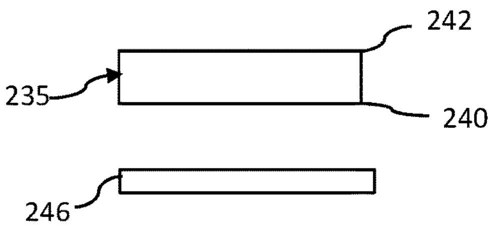
FIG. 8A shows a schematic side view of an exemplary rigid ring and a flexible right cylindrical stadium that may be combined to form an undulating structure of the present invention.

FIG. 8A shows a schematic side view of an exemplary rigid ring and a flexible right cylindrical stadium that may be combined to form an undulating structure of the present invention.

The right cylindrical stadium 235 may, for instance, be made of a suitable elastic material, and have an upper edge 242 that is a stadium, and which may be congruent to a lower edge 240 of the right cylindrical stadium. The lower edge 240 of the right cylindrical stadium may, for instance, serve as an attachment edge, The rigid stadium element 246 may be made of a suitably rigid material, and an inner perimeter may act as the curved restraining ring. This may, for instance, be in the form of a stopped groove, the groove oriented such that its open part faces inward, and the groove is in the plane of the ring.

Figure 8B:
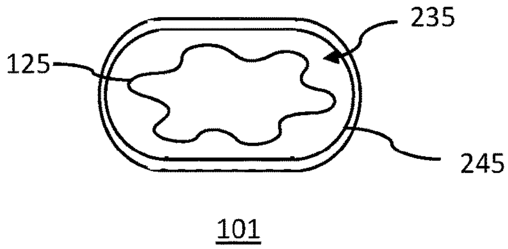
FIG. 8B shows a schematic plan view of an undulating structure of the present invention formed from a rigid ring and a flexible right cylindrical stadium.

FIG. 8B shows a schematic plan view of an undulating structure of the present invention formed from a rigid ring and a flexible right cylindrical stadium.

The elastic, right cylindrical stadium may, for instance, be attached by the stadium perimeter of its lower edge to an inner, stadium 245 of the rigid stadium element 246. This may, for instance, be achieved by having a stopped groove on the inner perimeter of the rigid stadium element. Such a stopped groove may serve both as an retaining edge, and as a stopping member. When joined, the elastic cylindrical stadium may buckle and deform to have one or more transverse deformations 125, thereby forming an undulating structure.

In alternate embodiments, the joining of the cylindrical stadium to the rigid stadium element may be achieved instead by one or more passive stopping members, or by one or more active, stopping members, or some combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A method of creating an undulating structure, comprising:

providing a curved, rigid restraining member;

providing an elastic sheet member having a Gaussian curvature equal to zero, and an attachment edge, and, wherein, a curvature of said attachment edge differs from a curvature of said curved, rigid restraining member;

attaching said elastic sheet member to said curved, rigid restraining member, thereby generating said undulating structure, comprising one or more transverse deformations of said elastic sheet member, and providing one or more stopping members shaped, sized and located such that they limit said transverse deformations, thereby preserving them.

2. The method of claim 1, wherein, said curved, rigid restraining member comprises a curved restraining edge, and, wherein, a curvature of said attachment edge differs from a curvature of said curved, rigid restraining member, and, wherein, said attachment edge is attached along its length to said curved restraining edge, thereby generating said undulating structure.

3. The method of claim 2, wherein, said curvature of said restraining edge is convex, and said curvature of said attachment edge is concave, and has an attachment edge radius of curvature that is less than a restraining edge radius of curvature of said restraining edge.

4. The method of claim 2, wherein, said curvature of said restraining edge is concave, and said attachment edge is a straight line.

5. The method of claim 2, wherein, said curvature of said restraining edge is concave, and said curvature of said attachment edge is concave.

6. The method of claim 2, wherein, said curvature of said restraining edge is concave, and said curvature of said attachment edge is convex, and has an attachment edge radius of curvature that is greater than a restraining edge radius of curvature of said restraining edge.

7. The method of claim 1, wherein, said elastic sheet member is a cylindrical shell and said attachment edge is a lower edge of said cylindrical shell; and said rigid restraining member is a rigid ring and said stopping member is a stopped groove.

8. The method of claim 2, wherein, said elastic sheet member is a disc having an interior cutout; said rigid restraining member is a rigid ring; and, said stopping member is a stopped groove having an opening disposed on a plane of said ring; and said attachment edge is a perimeter of said interior cutout.

9. The method of claim 1, wherein, at least one of said stopping members is a passive stopping member that allows said transverse deformations of said elastic sheet member to oscillate within a predetermined angular range about a point of attachment to said rigid restraining member.

10. The method of claim 9, wherein, at least one of said passive stopping members is an active, stopping member that powers said elastic sheet member to oscillate.

11. The method of claim 10, wherein, said active, stopping member is powered by an electrical stepping motor.

12. The method of claim 9, wherein, said predetermined angular range is within +/−45 degrees of a mean position of said elastic sheet member.

13. The method of claim 2, wherein said elastic sheet member is a right circular cylindrical shell and said attachment edge is a lower edge of said cylindrical shell; and said curved restraining edge is circular.

14. The method of claim 13, wherein, said stopping member is a stopped groove.

15. The method of claim 2, wherein said elastic sheet member is a frustum of a cone and said attachment edge is a lower edge of said frustum of said cone; and said curved restraining edge is circular.

16. The method of claim 15, wherein, said stopping member is a stopped groove.

17. The method of claim 2, wherein, said elastic sheet member is a right elliptic cylinder, and said attachment edge is a lower edge of said right elliptic cylinder; and said curved restraining edge is an ellipse.

18. The method of claim 17, wherein, said stopping member is a stopped groove.

19. The method of claim 1, wherein said elastic sheet member is a right cylindrical stadium, and said attachment edge is a lower edge of said right cylindrical stadium; and wherein, said curved, rigid restraining member comprises a curved restraining edge that is a stadium.

20. The method of claim 19, wherein, said stopping member is a stopped groove.

* * * * *